Figure 1:
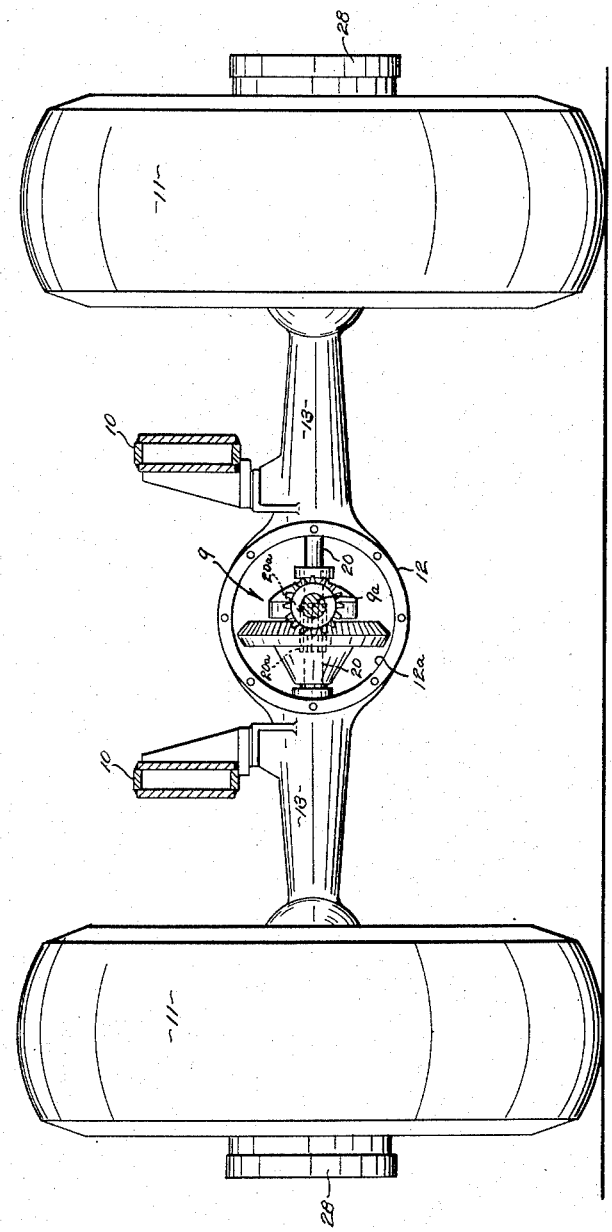

Aug. 6, 1957     A. P. ARMINGTON     2,801,702
STEERABLE DRIVING AXLE

Filed May 6, 1953     2 Sheets-Sheet 1

INVENTOR.
ARTHUR P. ARMINGTON
BY
*Hyde, Meyer, Baldwin & Doran*
ATTORNEYS

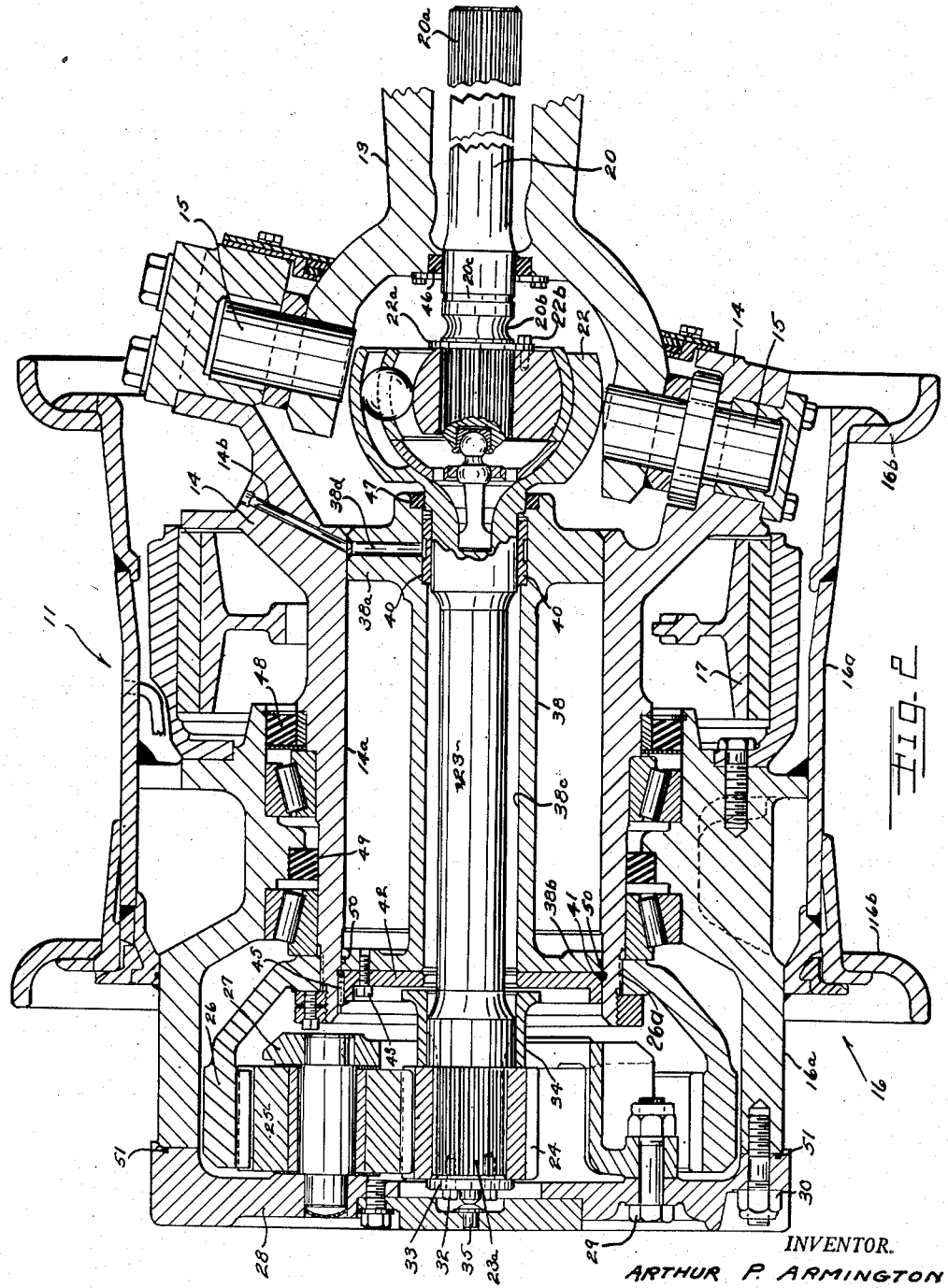

United States Patent Office 2,801,702
Patented Aug. 6, 1957

2,801,702

STEERABLE DRIVING AXLE

Arthur P. Armington, Willoughby, Ohio, assignor, by mesne assignments, to General Motors Corporation, Detroit, Mich., a corporation of Delaware Application May 6, 1953, Serial No. 353,295

15 Claims. (Cl. 180—43)

This invention relates to improvements in a drive shaft supporting structure and more particularly to a quickly disassemblable drive shaft supporting structure when used on a steerable driving axle.

One of the objects of the present invention is to provide a drive shaft having a means for determining its fracture point under excess loads and having a means for pulling it from its housing after fracture.

Another object of the present invention is to provide a properly supported rotatable shaft having an enlargement thereon with the shaft support arranged so that the shaft with its enlargement can be pulled therethrough for easy disassembly.

Another object of the present invention is to provide a power operated vehicle supported by a rotatable driving wheel with a driving mechanism arranged for disassembly without removing the wheel from the vehicle so that the wheel will continually support the vehicle during repair or disassembly.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a front view of the rear axle showing a portion of a vehicle to which the axle is connected and showing its differential housing with the front cover removed therefrom and with drive wheels on opposite sides thereof; while Fig. 2 is a vertical, transverse, sectional view through the steerable driving axle and the rotatable wheel on the left in Fig. 1.

The present invention relates to combined steerable and driving wheels having a universal joint in the drive wherein it is possible to remove the universal joint and the remaining drive connected thereto without disturbing the wheels and tires and without eliminating the support provided for the vehicle by said wheels. All repair work on the wheel driving mechanism can be performed while the wheels and tires support the vehicle. It has been found by experience that it takes about two days to jack up an off-the-highway vehicle weighing about 25 tons, to remove the two wheels by the use of a crane and to remove the other associated parts so that the gears in the differential housing may be removed, and then to replace all of these parts. This invention will cut this repair time down to about one-half a day, one quarter of the previous time, since it will no longer be necessary to jack up the heavy vehicle or to use a crane to remove the wheel and tire assemblies.

Although the present invention is illustrated in this application as applied to the steerable and driving wheels and the drive differential therefor of a heavy off-the-highway vehicle of any desired type, it will be understood by those skilled in the art that this invention may be applied to other drive shaft constructions, and to vehicles with opposed driving wheels whether the same are steered or not.

The power operated vehicle of the present invention includes a body frame comprising longitudinally extending frame members 10, 10 in Fig. 1 secured by any suitable connecting means to a rear axle housing comprising a differential housing 12 and coaxially aligned drive shaft housings 13, 13 formed integral therewith and projecting outwardly therefrom in opposite directions. The differential housing 12 has driving means 9 therein, in the present disclosure of a bevel gear type, being driven by a longitudinal drive shaft 9a extending from the vehicle drive motor rearwardly through hole 12a in the front of differential housing 12. Of course, the housing around longitudinal drive shaft 9a can be detachably secured to housing 12 about hole 12a to form a cover therefor. Hence, the motor drives a pair of driving wheel assemblies 11, 11 located one on each side of and driven by said differential driving means 9 with the drive wheel assemblies 11, 11 and differential housing 12 being located in an approximately straight line, in the same manner as on any other conventional vehicle, such as an automobile or truck. Only the wheel assembly 11 on the left side of it, as shown in Fig. 2, will be described hereafter in detail. However, it should be readily understood that a two wheel drive vehicle will have one differential housing 12 with similar wheel structures on the left and right thereof, as shown in Fig. 1, while a four wheel drive vehicle will have four wheels and two differentials with each differential and its associated two wheels similarly arranged.

The vehicle body frame on the left in Fig. 1 includes a drive shaft housing 13. This drive shaft or axle housing 13 has a wheel supporting frame 14 in Fig. 2 pivotally attached thereto by aligned steering trunnions 15, 15 providing a steering axis with a pivotal attachment. Of course, the two wheels in Fig. 1 located on opposite sides of the differential housing 12 will steer together and can be connected by a conventional tie rod to each wheel supporting frames 14 for joint operation. A conventional steering arm will be secured to either wheel supporting frame 14 for steering this pair of opposite wheels. A wheel, generally shown at 16, is rotatably mounted by spaced annular roller bearings on the wheel supporting frame 14 with this wheel, along with the other wheels, having tires thereon and being adapted to support the whole power operated vehicle. The wheel 16 includes an annular base 16a having rims 16b secured thereto for mounting a tire thereon. A brake 17 is secured between the wheel 16 and the wheel supporting frame 14 for providing braking. It should be noted that both the wheel 16 and the wheel supporting frame 14 are steerable about the axis of trunnions 15, 15.

The wheel 16 in Fig. 2 is not only a steerable wheel but also a power driven wheel. Differential driving means 9 in Fig. 1 rotatably drives two horizontally aligned driving shafts 20, 20 on fixed, coaxial axes with each of these shafts connected on its outer end to either the left or the right wheel assembly 11. The inner end of each of these shafts 20 has a spline 20a for detachable driving connection in the bore of the driven gear of the driving means 9. Fig. 1 shows splines 20a, 20a in generally abutting relationship.

The drive shaft connected to the left wheel is shown at 20 in Fig. 2. This drive shaft 20 is enclosed within axle housing 13 and is suitably rotatably mounted therein with its driver or left end in Fig. 2 protruding out of this housing 13 toward the wheel supporting frame 14 on the wheel side of the housing 13. Since the purpose of the detachable feature will be brought out hereinafter in the specification in more detail, it will be sufficient now to say that the driven end drive shaft spline 20a can be removed from the differential housing 12 by endwise movement of drive shaft 20 toward the left in Fig. 2 by pulling the driver end out first through the drive shaft housing 13 and wheel supporting frame 14.

A constant velocity universal joint 22 connects the driver end of the drive shaft 20 and the driven, inner or right end of a second drive shaft 23 with at least one axis of the universal joint 22 being located on the pivotal and steering axis of trunnions 15, 15 for preventing appreciable axial movement of the shafts 20 and 23 during steering and for permitting steering of the wheel 16. Although universal joint 22 might be splined or otherwise detachably connected to one of said drive shafts 20 or 23, the drawings in the present application illustrate the first drive shaft 20 locked into the universal joint 22 by a split locking ring 22a bolted to the inner race of the universal joint by bolt 22b. This universal joint 22 may be of any suitable construction. The one illustrated is known as a constant velocity joint and is the preferable type because when such joint is driven at constant or uniform velocity by drive shaft 20, the drive shaft 23 is driven at a uniform velocity at all steering angles so as to give smooth power transmission.

This second drive shaft 23 is located within a cylindrical, central bore 14a of the wheel supporting frame 14 and is rotatably mounted therein by structure to be described in more detail hereinafter. A detachable drive means connects the outer end of the second drive shaft with the wheel 16 at its driver left end in Fig. 2. This drive means provides suitable speed reducing gearing in the specific form shown including a sun gear 24 secured to a spline 23a formed on the left end of the drive shaft 23, which sun gear floats freely between and drives a set of three planet gears 25 circumferentially spaced about sun gear 24 which mesh with the internal teeth of a ring gear 26 attached or detachably connected to the wheel supporting frame 14 by a spline 26a. Planet gears 25 are rotatably mounted in a cage made up of a side plate 27, and a cover plate 28 bolted together by bolts and nuts 29. This cage is bolted to the wheel 16 by studs and nuts 30. A cap 33 keeps the sun gear 24 securely on the second drive shaft spline 23a by threaded screws 32.

The sun gear 24 not only is permitted to float freely and unrestricted by a confining bearing at the driver outer end of the drive shaft, but also is self-accommodating to its several planet gears 25 so that the torque and wear are evenly and uniformly distributed and so that vibration is reduced.

This drive through gears 24, 25, and 26 acts as a speed reducer between the universal joint 22 and the wheel 16 so that not only the universal joint 22 itself but also drive shafts 20 and 23 on either side of it may be rotated at much higher speed by reason of the reduction in torque carried through or by them, and consequently these parts may be made smaller, lighter and more compact with wear upon them reduced to a minimum. A universal joint 22 large enough to drive the wheel 16 and the tire thereon for a large vehicle of the off-the-highway class without a gear reduction between this universal joint and the tire itself would undoubtedly be prohibitively large in size.

Any endwise movement of shaft 23 is limited by thrust collar 34 and thrust button 35 respectively pressing against the right face of sun gear 24 and against a projection on the left face of cap 33. However, there can be enough endwise clearance so that the universal joint 22 or any other equivalent universal joint can center itself exactly in the center of the steering pivot axis through trunnions 15, 15, if the universal joint requires this centering.

An annular adaptor member 38 of spool shape removably fits into the supporting frame bore 14a and rotatably supports drive shaft 23 in a concentric cylindrical bore 38c therethrough, concentric with the wheel frame bore 14a. A bearing means or bushing 40 is pressed into an enlargement at the right hand side of the spool bore 38c to rotatably mount the second drive shaft 23 in the spool bore 38c. The spool bore 38c and the second drive shaft 23 have sufficient clearance therebetween so that the driver or left end of the second drive shaft 23 can float. The bearing means 40 and the second drive shaft 23 also have sufficient clearance between them for permitting this floating action. This float permits the sun gear 24 to center itself between the planet gear 25.

This construction is peculiarly adapted to driving wheels having large tires of considerable width that must be steered. By placing the planetary gearing at the outer or left side of the wheel in Fig. 2, it is possible to use a drive shaft 23 of sufficient length (here approximately 21 inches from its left end to the middle of bearing 40) extending across the complete width of the hub so that the self-alignment of sun gear 24 in the planetary system is accomplished by this floating action.

The spool adaptor 38 has radially extending annular flanges 38a and 38b on opposite ends thereof so that the spool is H-shaped in longitudinal section with the spaced flanges 38a and 38b extending between the concentric wheel supporting frame bore 14a and the spool bore 38c. The inner flange 38a is located in radial alignment with the bearing means 40 for support while the flange 38b at the driver end of the second drive shaft 23 is located some distance to the left thereof to prevent excessive float and whip of drive shaft 23. The spool adaptor 38, well supported in bore 14a, supports bearing means 40 and shaft 23 to prevent excessive float and whip of shaft 23.

The annular adaptor member or spool 38 is locked into the wheel supporting frame 14 by a lock ring 41 engaging the left edge of flange 38b and a groove cut into the wheel supporting frame bore 14a. A locking ring retainer annular member is shown at 42 with screws 43 joining it to the flange 38b. This locking structure is easily accessible for disassembly since flange 38b is located as far to the left as possible.

The rotating drive shaft 23 in bearing means 40 is lubricated through aligned hole 14b in wheel supporting frame 14 and hole 38d in the spool flange 38a. A key 45 in aligned slots in lock ring retainer 42 and wheel supporting frame bore 14a prevents the spool 38 and the assembly thereon from turning so that no relative rotation can take place between the spool 38 and the wheel supporting frame 14. Hence, the lubricating holes 14b and 38d will always stay aligned.

A plurality of lubricant seals are located at different places in the Fig. 2 construction and are designated seals 46, 47, 48, 49, 50, and 51. Seal 46 keeps the lubricant from the differential housing 12 out of the universal joint chamber. Seal 50 takes the form of an O ring to prevent the planetary lubrication from entering the universal joint chamber. Seal 51 prevents leakage of the planetary gearing lubrication between the wheel 16 and the cover plate 28.

The principal object of the present invention is to make it possible to remove the constant velocity universal joint 22 required in steering, the first drive shaft 20 and the second drive shaft 23 without disturbing the support of the vehicle furnished by the wheel 16 and the tire thereon. As mentioned before, it has been found by experience that it takes about two days to jack up the vehicle (when weighing about 25 tons) to remove the opposite wheels by use of a crane, to remove the other associated parts so that the driving means 9 in the differential housing 12 may be removed, and to replace all of these parts. With this design, the differential driving means gears are changed and all damaged pieces in the wheels, if easily disassemblable, may be changed in about one-quarter this time (about half a day) since it will no longer be necessary to jack up the heavy vehicle or to use a crane to remove the wheel and tire assemblies.

The disassembly is as follows. Remove nuts on the studs 30 at the periphery of the cover plate 28; remove cover plate 28 including side plate 27 and the planet gears 25 so that the sun pinion 24 on the left or outer end of the drive shaft 23 is now exposed; remove screws 32, cap 33, sun gear 24, and thrust collar 34 from the end of the drive shaft; remove screws 43, lock ring retainer 42, lock ring 41 and spool 38 along with bearing means 40 and oil seal 47 since they are pressed into the bore of spool 38 (this leaves universal joint 22 and drive shaft 23 exposed); and remove the outer drive shaft 23, universal joint 22 and inner drive shaft 20 as a unit since they are locket together by a split locking ring 22a bolted to the innner race of the universal joint 22 and since spline 20a is endwise removable from differential housing 12. Seal 46 in axle housing 13 is now exposed and can be replaced if worn. Hence, the universal joint 22, although located inwardly from the spool 38 and being larger in diameter than the drive shaft 23 and the spool bore 38c, is less than the diameter of the wheel supporting frame bore 14a so that it can be easily removed. Hence, a repair man can easily pull the drive shaft 23, spool 38, bearing means 40, universal joint 22 and drive shaft 20 toward the left through the outward end of the wheel supporting frame bore 14a without removing either the wheel 16 or the wheel supporting frame 14 from the vehicle to eliminate the support thereof. It should be noted that the H-shape of the spool 38 provides easy removal because of its low weight and small frictional contact in the wheel supporting frame bore 14a.

Performing this disassembly operation on both wheel assemblies 11 on opposite ends of the differential housing 12 in Fig. 1 permits the removal of the gears of driving means 9 from differential housing 12 because drive shaft splines 20a for the left and right wheel assembly have been removed from the differential driving means 9 so that the gears can be pulled through the uncovered differential housing hole 12a. Hence, it is readily seen that a drive shaft means, comprising the drive shafts of one or both wheels, is detachably connected to the differential driving means 9 and to one or both wheels or wheel assemblies remote from the differential. Therefore, a repair man can pull the drive shaft means outwardly through said supporting frame bore 14a and its counterpart on the right wheel and then can remove the differential driving means 9 without removing the wheels and wheel supporting frame. This is especially important when both drive shaft 20 and its counterpart in the right wheel are in horizontal alignment with splines coaxially inserted into the differential driving means 9 so that they normally prevent the removal of the gear driving means 9 from the differential housing 12. Then, the drive shafts, since they oppose each other, must be pulled outwardly through the wheels.

Normally the drive shaft 20 in Fig. 2 can be readily pulled to the left during disassembly along with the universal joint 22. However, if the drive shaft 20 should become broken, it would be very difficult to pull it to the left out of the drive shaft housing 13 to remove the spline 20a from the differential housing 12. However, construction is provided for easy removal of even a broken drive shaft 20. This drive shaft 20 has its driver end leftwardly protruding from the drive shaft housing 13 in Fig. 2 with its protruding end having a "fuse" groove 20b with a round bottom slightly smaller in diameter than the remainder of the drive shaft 20 so that the shaft will fracture or fail at this point if it should break under excess load. A shaft puller attachment groove 20c of shallower depth is formed in the drive shaft 20 immediately to the right thereof on the drive shaft housing side of the "fuse" groove 20b for pulling the shaft from the drive shaft housing 13 after fracture or failure.

This pulling operation can be performed by inserting a shaft puller through the spindle or wheel supporting frame bore 14a from the left side of the wheel 16 and then fastening it on to the broken shaft at the puller groove 20c for removal of the drive shaft 20.

It should be readily understood that this construction embodying spool 38 and its associated parts could be used in other power transmission structures and the enlargement on the drive shaft 23 can take other forms than the universal joint 22. For example, the enlargement may be a gear or other type power transmission member either fixed to or removably connected to one or both drive shafts 20 and 23.

Although the preferred form of the invention has been shown in Fig. 2, it should be understood that other structures may have some of the advantages of the preferred form. For example, spool 38 and bushing 40, as well as the structure appurtenant thereto in bore 14a, may be replaced by a bushing, equivalent to bushing 40, located in Fig. 2 immediately to the right of seal 46 for rotatably supporting the left end of drive shaft 20 in the bore of drive shaft housing 13. Shaft 23 is then only supported on opposite ends by universal joint 22 and by the centering effect of planet gears 25 on sun gear 24. Hence, universal joint 22 may be removed by pulling it endwise to the left through the unobstructed wheel supporting frame bore 14a. Of course, either the outside diameter of spline 20a would have to be smaller in diameter than the bore of this bushing or the bushing would have to be removable endwise toward the left from housing 13. Hence, in both the preferred and in this form of the invention, a drive shaft is rotatably supported in its surrounding bore by a bearing means, with said bearing means comprising spool 38 and bushing 40 in the preferred form.

Various changes in details and arrangement of parts can be made by one skilled in the art without departing from the spirit of this invention or the scope of the appended claims.

What I claim is:

1. In combination, a drive shaft housing, and a drive shaft rotatably supported in said drive shaft housing but with one end protruding out of said housing for endwise removal from the housing, said drive shaft on its protruding end having a fuse groove for determining the shaft fracture point under excess load and having a shaft puller attachment groove located on the housing side of said fuse groove for pulling said shaft from the housing after fracture.

2. In combination, a wheel supporting frame having a bore therethrough, an adaptor member removably fitting into said wheel supporting frame bore and having a bore therethrough, the periphery of said adaptor member and the bore of said frame including means permitting removal of said adaptor member through the outward end of said frame bore, a drive shaft located within said wheel supporting frame bore and rotatably mounted in said adaptor member bore, and an enlargement on said drive shaft located inwardly in said wheel supporting frame from said adaptor member, the outside dimensions of said enlargement being greater than said adaptor member bore but less than the diameter of said wheel supporting frame bore, whereby a repair man can pull the drive shaft, adaptor member, and shaft enlargement through the outward end of said wheel supporting frame bore.

3. In combination, a frame having a bore therethrough, an adaptor member removably fitting into said frame bore and having a bore therethrough, the periphery of said adaptor member and the bore of said frame member including means permitting removal of said adaptor member through the outward end of said frame bore, a drive shaft located within said frame bore and rotatably mounted in said adaptor member bore, and a universal joint on said drive shaft located inwardly in said frame from said adaptor member, the outside dimensions of said universal joint being greater than said adaptor member bore but less than the diameter of said frame bore, whereby a repair man can pull the drive shaft, adaptor member, and universal joint through the outward end of said frame bore.

4. In combination, a drive shaft housing, a frame attached to said drive shaft housing and having a bore therethrough, a first drive shaft rotatably supported in said drive shaft housing but with one end protruding out of said housing toward said frame, the diameter of said first drive shaft being less than that of the frame bore, means for detachably connecting within the housing the opposite end of said first drive shaft for endwise first removal from the housing of said protruding end, an adaptor member removably fitting into said frame bore and having a bore therethrough, a second drive shaft located within said frame bore and rotatably mounted in said adaptor member bore and protruding through said frame toward said housing, and a universal joint connecting said first end of said first drive shaft and the inner end of said second drive shaft, the outside dimensions of said universal joint being greater than said adaptor member bore but less than the diameter of said frame bore, the periphery of said adaptor member and the bore of said frame including means permitting removal of said adaptor member through the outer end of said frame bore, whereby a repair man can pull the second drive shaft, adaptor member, universal joint and first drive shaft through the outward end of said frame bore.

5. A power operated vehicle, comprising a vehicle body frame, a wheel supporting frame attached to said body frame and having a bore therethrough, a wheel rotatably mounted on said wheel supporting frame and adapted to support said vehicle body frame, an adaptor member removably fitting into said wheel supporting frame bore and having a bore therethrough, a drive shaft located within said wheel supporting frame bore and rotatably mounted in said adaptor member bore, an enlargement on said drive shaft located on the driven end of said shaft inwardly from said adaptor member, the outside dimensions of said enlargement being greater than said adaptor member bore but less than the diameter of said wheel supporting frame bore, and a detachable drive means drivingly connecting the outer end of said drive shaft and said wheel, the transverse peripheral dimensions of said adaptor member being less than the corresponding transverse dimensions of said frame bore along the path of outward removal of said adaptor member through the outer end of said frame bore, whereby a repair man can pull the drive shaft, adaptor member, and shaft enlargement through the outward end of said wheel supporting frame bore without removing said wheel and wheel supporting frame from said vehicle to eliminate the support thereof.

6. A power operated vehicle, comprising a vehicle body frame, a wheel supporting frame attached to said body frame and having a bore therethrough, a wheel rotatably mounted on said wheel supporting frame and adapted to support said vehicle body frame, a spool removably fitting into said wheel supporting frame bore and having a bore therethrough, a drive shaft located within said wheel supporting frame bore, a bearing means rotatably mounting said drive shaft in said spool bore, an enlargement on said drive shaft located on the driven end of said shaft inwardly from said spool, the outside dimensions of said enlargement being greater than said spool bore but less than the diameter of said wheel supporting frame bore, and a detachable drive means drivingly connecting the outer end of said drive shaft and said wheel, said spool being H-shaped in longitudinal section with spaced flanges extending between the said spool and wheel supporting frame bores with one flange located in radial alignment with said bearing means for support, the periphery of said spool flanges and the bore of said frame member including means locating at least one of said flanges in frictional contact with the frame bore in assembled position to maintain lateral alignment thereof and permitting removal of said spool through the outward end of said frame bore, whereby a repair man can pull the drive shaft, spool, bearing means, and shaft enlargement through the outward end of said wheel supporting frame bore without removing said wheel and wheel supporting frame from said vehicle to eliminate the support thereof, said spool being H-shaped for easy removal because of its low weight and small frictional contact.

7. A power operated vehicle, comprising a vehicle body frame, a wheel supporting frame attached to said body frame and having a bore therethrough, a wheel rotatably mounted on said wheel supporting frame and adapted to support said vehicle body frame, a spool removably fitting into said wheel supporting frame bore and having a bore therethrough, a drive shaft located within said wheel supporting frame bore, a bearing means rotatably mounting said drive shaft in said spool bore, an enlargement on said drive shaft located on the driven end of said shaft inwardly from said spool, the outside dimensions of said enlargement being greater than said spool bore but less than the diameter of said wheel supporting frame bore, and a floating detachable drive means drivingly connecting the outer end of said drive shaft and said wheel, said spool and said drive shaft having sufficient clearance therebetween and said bearing means supporting said drive shaft near only its driven end with sufficient clearance for floating said driver end, said spool being H-shaped in longitudinal section with spaced flanges extending between said spool and wheel supporting frame bores with one flange located in radial alignment with said bearing means for support and another near the driver end of said drive shaft to prevent excessive shaft float and whip, whereby a repair man can pull the drive shaft, spool, bearing means, and shaft enlargement through the outward end of said wheel supporting frame bore without removing said wheel and wheel supporting frame from said vehicle to eliminate the support thereof, said spool being H-shaped for easy removal because of its low weight and small frictional contact.

8. A power operated vehicle, comprising a vehicle body frame, a wheel supporting frame attached to said body frame and having a bore therethrough, a wheel rotatably mounted on said wheel supporting frame and adapted to support said vehicle body frame, an adaptor member removably fitting into said wheel supporting frame bore and having a bore therethrough, a drive shaft located within said wheel supporting frame bore, bearing means rotatably mounting said drive shaft in said adaptor member bore, an enlargement on said drive shaft located on the driven end of said shaft inwardly from said adaptor member, the outside dimensions of said enlargement being greater than said adaptor member bore but less than the diameter of said wheel supporting frame bore, and a floating detachable drive means drivingly connecting the outer end of said drive shaft and said wheel, said adaptor member and said drive shaft having sufficient clearance therebeweeen and said bearing means supporting said drive shaft near only its driven end with sufficient clearance for floating said driver end, whereby a repair man can pull the drive shaft, adaptor member, bearing means, and shaft enlargement through the outward end of said wheel supporting frame bore without removing said wheel and wheel supporting frame from said vehicle to eliminate the support thereof.

9. A power operated vehicle, comprising a vehicle body frame including a drive shaft housing, a wheel supporting frame attached to said body frame and having a bore therethrough, a wheel rotatably mounted on said wheel supporting frame and adapted to support said vehicle body frame, a first drive shaft rotatably supported in said drive shaft housing but with its driver end on the wheel side thereof, the diameter of said first drive shaft being less than that of the frame bore, means for detachably connecting to the vehicle power source within the housing the driven end of said first drive shaft for endwise removal from the housing by the driver end first, an adaptor member removably fitting into said wheel supporting frame bore and having a bore therethrough, a second drive shaft located within said wheel supporting frame bore and rotatably mounted in said adaptor member bore, a universal joint connecting the driver end of said first drive shaft and the driven end of said second drive shaft, the outside dimensions of said universal joint being greater than said adaptor member bore but less than the diameter of said wheel supporting frame bore, a detachable drive means drivingly connecting said second drive shaft driver end and said wheel, the transverse peripheral dimensions of said adaptor member being less than the corresponding transverse dimensions of said frame bore along the path of outward removal of said adaptor member through the outer end of said frame bore, whereby a repair man can pull through the outward end of said wheel supporting frame bore the second drive shaft, adaptor member, universal joint and first drive shaft without removing said wheel and wheel supporting frame from said vehicle to eliminate the support thereof.

10. A power operated vehicle, comprising a vehicle body frame including a drive shaft housing, a wheel supporting frame pivotally attached to said drive shaft housing and having a bore therethrough, the axis of said pivotal attachment being a steering axis, a wheel rotatably mounted on said wheel supporting frame and adapted to support said vehicle body frame with said wheel and wheel supporting frame being steerable about said axis, a first drive shaft rotatably supported in said drive shaft housing but with its driver end on the wheel side thereof, the diameter of said first drive shaft being less than that of the frame bore, means for detachably connecting to the vehicle power source within the housing the driven end of said first drive shaft for endwise removal from the housing by the driver end first, an adaptor member removably fitting into said wheel supporting frame bore and having a bore therethrough, a second drive shaft located within said wheel supporting frame bore and rotatably mounted in said adaptor member bore, a universal joint connecting the driver end of said first drive shaft and the driven end of said second drive shaft with a universal joint pivotal axis being coaxial with said steering axis for preventing axial movement of said shafts, the outside dimensions of said universal joint being greater than said adaptor member bore but less than the diameter of said wheel supporting frame bore, a detachable drive means drivingly connecting said second drive shaft driver end and said wheel, the periphery of said adaptor member and the bore of said frame including means permitting removal of said adaptor member through the outward end of said frame bore, whereby a repair man can pull through the outward end of said wheel supporting frame bore the second drive shaft, adaptor member, universal joint and first drive shaft without removing said wheel and wheel supporting frame from said vehicle to eliminate the support thereof.

11. A power operated vehicle, comprising a vehicle body frame including a drive shaft housing, a wheel supporting frame attached to said body frame and having a bore therethrough, a wheel rotatably mounted on said wheel supporting frame and adapted to support said vehicle body frame, a first drive shaft rotatably supported in said drive shaft housing but with its driver end protruding out of said housing on the wheel side thereof, the diameter of said first drive shaft being less than that of the frame bore, means for detachably connecting to the vehicle power source within the housing the driven end of said first drive shaft for endwise removal from the housing by the driver end first, an adaptor member removably fitting into said wheel supporting frame bore and having a bore therethrough, a second drive shaft located within said wheel supporting frame bore and rotatably mounted in said adaptor member bore, a universal joint connecting the driver end of said first drive shaft and the driven end of said second drive shaft, the outside dimensions of said universal joint being greater than said adaptor member bore but less than the diameter of said wheel supporting frame bore, a detachable drive means drivingly connecting said second drive shaft driver end and said wheel, said first drive shaft on its protruding driver end having a fuse groove for determining the shaft fracture point under excess load and having a shaft puller attachment groove located on the housing side of said fuse groove for pulling said shaft from the housing after fracture, whereby a repair man can pull through the outward end of said wheel supporting frame bore the second drive shaft, adaptor member, universal joint and first drive shaft, whether broken or not broken, without removing said wheel and wheel supporting frame from said vehicle to eliminate the support thereof.

12. A power operated vehicle, comprising a vehicle body frame, a wheel supporting frame attached to said body frame and having a bore therethrough, a wheel rotatably mounted on said wheel supporting frame and adapted to support said vehicle body frame, an adaptor member removably fitting into said wheel supporting frame bore and having a bore therethrough, a drive shaft located within said wheel supporting frame bore, a bearing means rotatably mounting said drive shaft in said adaptor member bore, said wheel supporting frame and adaptor member having aligned lubrication holes in communication with said bearing means for lubricating said drive shaft, means for keeping said lubrication holes aligned, an enlargement on said drive shaft located on the driven end of said shaft inwardly from said adaptor member, the outside dimensions of said shaft enlargement being greater than said adaptor member bore but less than the diameter of said wheel supporting frame bore, a detachable drive means drivingly connecting the outer end of said drive shaft and said wheel, whereby a repair man can pull the drive shaft, adaptor member, bearing means, and shaft enlargement through the outward end of said wheel supporting frame bore without removing said wheel and wheel supporting frame from said vehicle to eliminate the support thereof.

13. A power operated vehicle, comprising a vehicle body frame, a wheel supporting frame attached to said body frame and having a bore therethrough, a wheel rotatably mounted on said wheel supporting frame and adapted to support said vehicle body frame, an annular member removably fitting into said wheel supporting frame bore and having a concentric bore therethrough, a drive shaft located within said wheel supporting frame bore, a bearing means rotatably mounting said drive shaft in said annular member bore, said wheel supporting frame and annular member having aligned lubrication holes in communication with said bearing means for lubricating said drive shaft, means preventing relative rotation between said annular member and said wheel supporting frame for keeping said lubrication holes aligned, an enlargement on said drive shaft located on the driven end of said shaft inwardly from said annular member, the outside dimensions of said enlargement being greater than said annular member bore but less than the diameter of said wheel supporting frame bore, a detachable drive means drivingly connecting the outer end of said drive shaft and said wheel, whereby a repair man can pull the drive shaft, annular member, bearing means, and shaft enlargement through the outward end of said wheel supporting frame bore without removing said wheel and wheel supporting frame from said vehicles to eliminate the support thereof.

14. A power operated vehicle, comprising a vehicle body frame including a drive shaft housing, a wheel supporting frame pivotally attached to said body frame and having a bore therethrough, the axis of said pivotal attachment being a steering axis, a wheel rotatably mounted on said wheel supporting frame and adapted to support said vehicle body frame with said wheel and wheel supporting frame being steerable about said axis, a first drive shaft rotatable in the bore of said drive shaft housing but with its driver end on the wheel side thereof, the diameter of said first drive shaft being less than that of the frame bore, a second drive shaft rotatable in said wheel supporting frame bore, a universal joint connecting the driver end of said first drive shaft and the driven end of said second drive shaft with a universal joint pivotal axis being coaxial with said steering axis, bearing means near said universal joint for rotatably supporting one of said shafts in its surrounding bore, the outside dimensions of said universal joint being less than said wheel supporting frame bore, a detachable drive means drivingly connecting said second drive shaft driver end and said wheel, the periphery of said bearing means and the bore of said frame including means permitting removal of said bearing means through the outward end of said frame bore, whereby a repair man can pull through the outward end of said wheel supporting frame bore the second drive shaft, bearing means and universal joint without removing said wheel and wheel supporting frame from said vehicle to eliminate the support thereof.

15. A power operated vehicle, comprising a vehicle body frame, driving means detachably connected to said vehicle body frame, two opposite wheel supporting frames attached to said body frame with each frame having a bore therethrough and being located on opposite sides of said driving means, a wheel rotatably mounted on each wheel supporting frame and adapted to support said vehicle body frame, said wheel being substantially axially coextensive with said supporting frame bore, drive shaft means, means detachably connecting said drive shaft means to said driving means and to said wheels remote from said driving means, said drive shaft means including a shaft extending through each supporting frame bore and an enlargement located at the inner end of said supporting frame bore and wheel, and means for detachably and rotatably supporting each shaft in its supporting frame bore, the maximum diameter of said means detachably connecting said drive shaft means to said driving means and the maximum diameter of said enlargement being less than the inner diameter of said bore, whereby said drive shaft means may be removed outwardly through said supporting frame bores and said driving means may be disconnected from the vehicle body frame without removing said wheel and wheel supporting frame from said vehicle to eliminate the support thereof.

References Cited in the file of this patent

UNITED STATES PATENTS

| | | |
|---|---|---|
| 1,121,751 | Montgomery | Dec. 22, 1914 |
| 1,343,358 | Fairchilds | June 15, 1920 |
| 1,467,152 | Fuller | Sept. 4, 1923 |
| 1,922,962 | Lambert | Aug. 15, 1933 |
| 1,990,344 | Newhouse | Feb. 5, 1935 |
| 2,356,164 | Keese | Aug. 22, 1944 |
| 2,424,578 | Mortag | July 29, 1947 |
| 2,543,811 | Snow et al. | Mar. 6, 1951 |

FOREIGN PATENTS

| | | |
|---|---|---|
| 479,722 | Great Britain | Feb. 5, 1916 |
| 517,465 | Great Britain | Jan. 31, 1940 |